July 10, 1951         A. M. SASGEN ET AL         2,560,131
HAND TRUCK WITH ELEVATOR PLATFORM
Filed June 28, 1950                    2 Sheets-Sheet 1
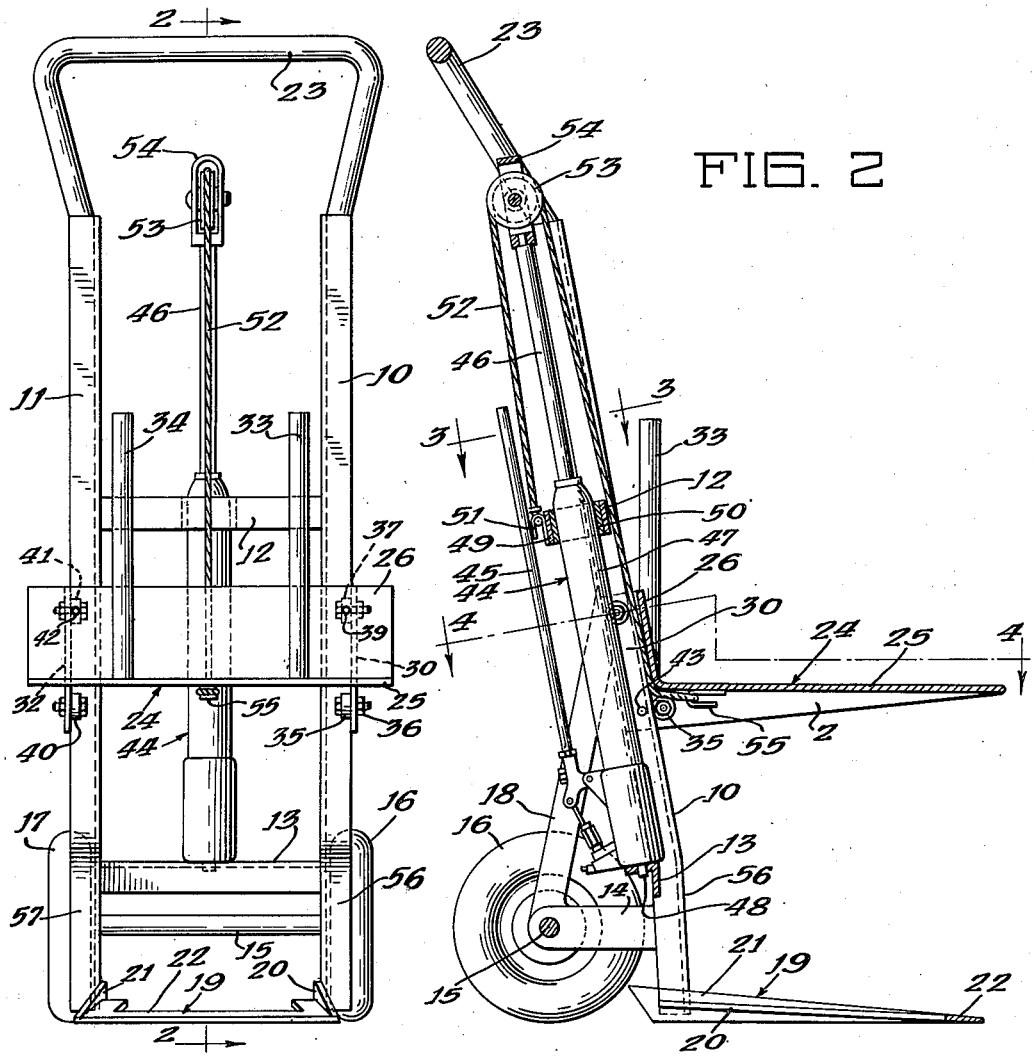
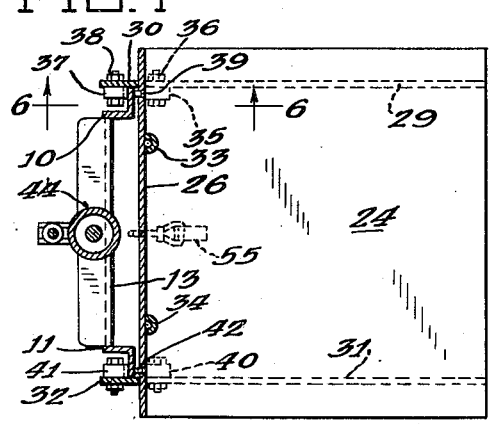
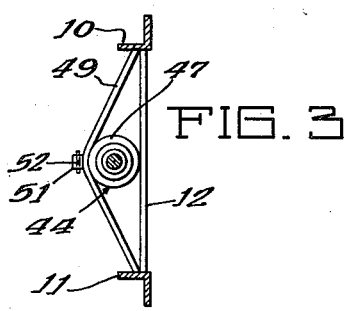
Inventors:
Anthony M. Sasgen
Fred P. Hopfeld
By: Wallace and Cannon
Attorneys July 10, 1951 A. M. SASGEN ET AL 2,560,131
HAND TRUCK WITH ELEVATOR PLATFORM
Filed June 28, 1950 2 Sheets—Sheet 2
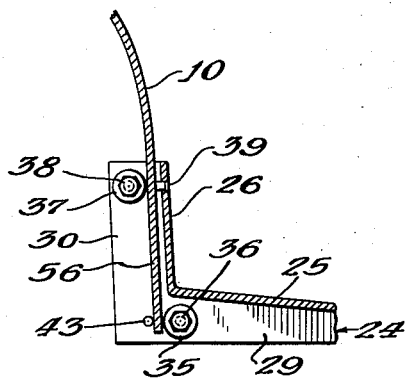
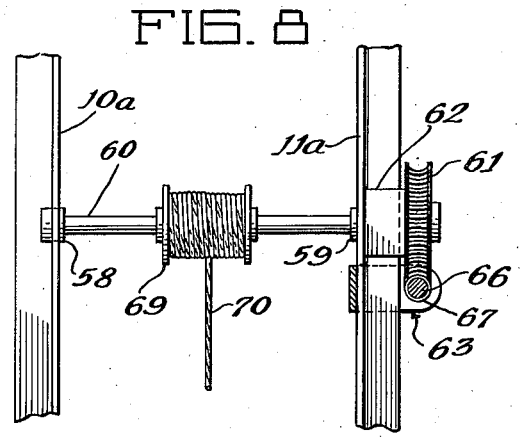
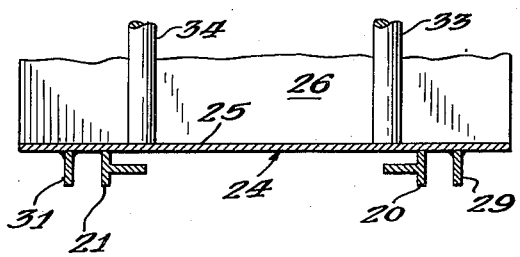
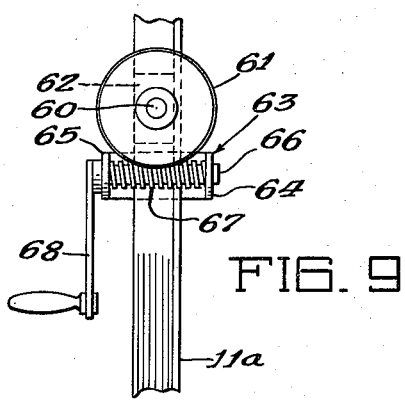
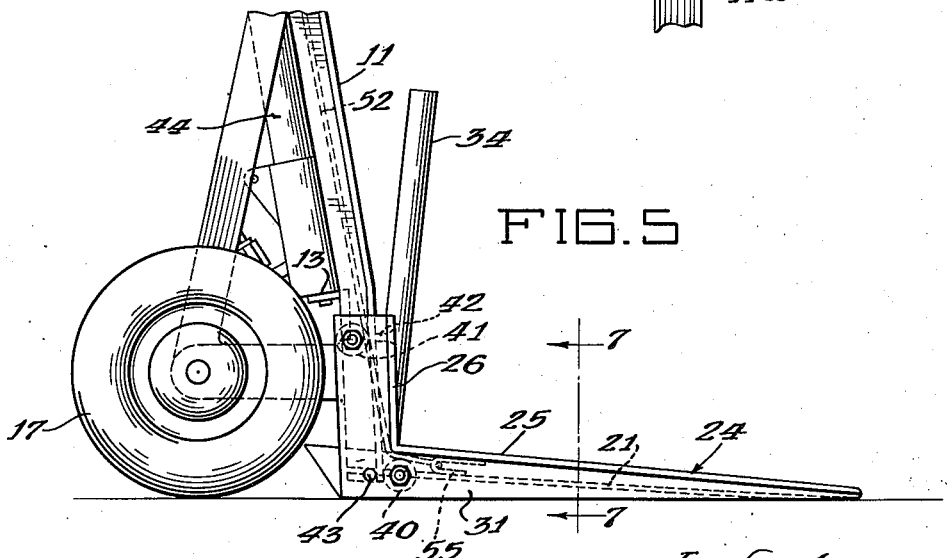

Patented July 10, 1951

2,560,131

UNITED STATES PATENT OFFICE 2,560,131

HAND TRUCK WITH ELEVATOR PLATFORM

Anthony M. Sasgen, Chicago, and Fred P. Hopfeld, Elmwood Park, Ill., assignors to Grand Specialties Company, Chicago, Ill., a corporation of Illinois Application June 28, 1950, Serial No. 170,834

5 Claims. (Cl. 214—100)

This invention relates to hand trucks of the two-wheel variety such as are commonly used to transport boxes, crates, barrels, etc., from one place to another, in warehouses, factories, and the like. A hand truck of this kind as constructed heretofore, has included a fixed tongue projected forwardly from the lower end of the truck. Such a tongue was inserted beneath the bottom marginal edge of an article to be transported so that when the frame of the truck was tilted into an acute angular position relative to the surface on which it was rested, the tongue would be effective to prevent movement of the article along the frame of the truck on which the articles would be rested when the truck was disposed in the just mentioned position. The frame of a truck of the aforesaid character also has wheels at the lower end thereof and the truck is pivoted about the axis of such wheels to be moved into the aforesaid acute angular relation with the surface over which the truck is to be moved and in such circumstances the truck and any article mounted thereon is supported by the wheels to facilitate transportation of an article from one place to another.

Hand trucks of the aforesaid kind are often used in machine shops and other places where an article picked up and carried by the truck is to be disposed in a position above the surface over which the truck is moved. For example, when a punch and die assembly is picked up from the floor and is disposed on a truck of the aforesaid nature to be transported to a punch press, it is necessary to manually raise the assembly from the floor to enable it to be moved onto the bed of the press in which the punch and die assembly is to be mounted. In hand trucks as these have been constructed heretofore, in circumstances such as the foregoing, considerable physical exertion was required in order to manually raise an article from the floor to an elevated position. In view of this, it is a primary object of the present invention to enable an article carried by a hand truck, in the nature of that described hereinabove, to be expeditiously moved from the lower to an elevated position, or vice versa, without objectionable physical exertion.

Objects of this invention ancillary to the foregoing are to equip a hand truck of the aforesaid character with a novel platform that is arranged to be disposed beneath at least a marginal portion of an article to be moved; to connect such a platform to the frame of the truck in a novel manner so as to enable the platform to be moved along the frame of the truck; and to utilize a novel arrangement embodying a mechanical advantage to effect movement of the platform along the frame of the truck without acquiring excessive physical exertion.

A further object of this invention is to so arrange the frame of a hand truck in the nature of that described hereinabove that a platform of the aforesaid character will be moved into an inclined position when disposed at the lower end of the frame so as to thereby facilitate insertion of the platform beneath an article to be transported on the truck.

Other and further objects of the present invention will be apparent from the following description and claims and are illustrated in the accompanying drawings which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a front elevation of a hand truck embodying the present invention and wherein the movable platform is arranged in a somewhat elevated position;

Fig. 2 is a vertical sectional view taken substantially on the line 2—2 on Fig. 1;

Figs. 3 and 4 are horizontal sectional views taken substantially and respectively on the lines 3—3 and 4—4 on Fig. 1;

Fig. 5 is a fragmentary side elevational view of the truck shown in Figs. 1 and 2, but wherein the movable platform is disposed in its lowered position;

Fig. 6 is a sectional detail view taken substantially on the line 6—6 on Fig. 4 and drawn to a somewhat larger scale;

Fig. 7 is a sectional detail view taken substantially on the line 7—7 on Fig. 5;

Fig. 8 is a fragmentary rear elevational view of a modified form of construction; and Fig. 9 is a fragmentary side elevational view of the arrangement illustrated in Fig. 8.

The hand truck of the present invention embodies spaced apart frame members 10 and 11 which, as best shown in Figs. 3 and 4, are formed of angle iron and which are arranged to have corresponding flanges thereon disposed in parallel relation with each other while the other flanges are faced one toward the other, or inwardly as the arrangement is viewed in Fig. 4. A cross brace 12 extends between the inwardly disposed flanges of the frame members 10 and 11 substantially midway in the extent thereof and is secured to the frame members in any suitable manner as by welding. A further cross member 13 is extended between the frame members 10 and 11 adjacent to the lower ends of these members and this cross member 13 is also secured to the frame members in a suitable manner as by welding.

Arms as 14 are respectively secured to the frame members 10 and 11 and extend rearwardly therefrom and afford a support for an axle 15 on which wheels 16 and 17 are mounted. Braces as 18 are respectively extended between the axle 15 and the side frame members 10 and 11. The frame members 10 and 11 are pivotal about the axle 15 so as to be supported from the wheels 16 and 17.

The usual tongue 19 is provided at the lower ends of the frame members 10 and 11 and includes side flanges 20 and 21 which are respectively secured to the inwardly disposed flanges of the side frame members 10 and 11 in any suitable manner as by welding. The upper edges of the side flanges 20 and 21 are tapered forwardly so as to merge into the front bar 22 of the tongue 19, as best shown in Fig. 2.

In the present instance a handle 23, desirably formed from a cylindrical bar or tubular material, is provided at the upper end of the truck, such handle being substantially U-shaped and having the free ends thereof respectively secured to the upper ends of the side frame members 10 and 11 near the upper ends thereof. Desirably the bight portion of the handle 23 is straight, as best shown in Fig. 1, since this facilitates manipulation of the truck.

The hand truck as thus far described is of more or less standard construction and it is to be understood that the novel aspects of our invention could be incorporated in a hand truck including an equivalent but not necessarily identical construction without departing from the purview of our invention.

In accordance with our invention, a platform generally indicated by 24 is provided on the truck. As illustrated, this platform is formed from plate material to include a horizontal shelf 25 and a substantially vertically extending flange 26 which, as best shown in Figs. 2 and 6, is desirably arranged to extend at an obtuse angle with respect to the shelf 25. An angle plate as 29 is secured to the lower face of the shelf 25 as by welding and includes, as best shown in Fig. 2, a flange portion 30 that is disposed against the rear face of the flange 26 and which is joined thereto as by welding. A similar angle plate 31 is secured to the lower face of the shelf 25 and the rear face of the flange 26, this angle plate including a flange portion 32 corresponding to the flange portion 30. The plates 29 and 31 are secured to the lower face of the shelf 25 in such position that when the platform 24 is moved into its lowered position these plates will be respectively disposed outwardly of the side flanges 20 and 21.

While the flange 26 will be sufficient in most instances to insure displacement from the shelf 25 of any article disposed thereon, there may well be instances where a comparatively tall article will be handled by the truck. Moreover, cylindrical objects such as barrels and the like may be handled by the truck, and in order to prevent rolling movement of such cylindrical objects transversely of the shelf 25 and to facilitate retention of tall articles, rods as 33 and 34 are secured, as by welding, to the forwardly disposed face of the flange 26, the lower ends of such rods are tapered to be complementary to the forwardly disposed face of the flange 26, and the arrangement is such that the rods are extended in right angular relation with the shelf 25. Since the rods 33 and 34 are spaced apart as shown in Fig. 1, a cylindrical article rested on the shelf 25 will fit therebetween and be held against movement transversely of the shelf 25 when such an article is rested thereon. If desired, platform 24 might be in the nature of a suitably reenforced fork, especially when the truck is to be used in stacking operations.

The platform 24 is adapted to be moved along the side frame members 10 and 11 and to this end a roller 35 is mounted, as indicated at 36, on the inner face of the plate 29 and in position to be disposed in position to ride over the front face of the forwardly disposed flange of the side frame member 10. Another roller 37 is mounted near the upper end of the flange portion 30, as indicated at 38, and is disposed in position to ride over the rear face of the aforesaid flange of the side frame member 10. A stud 39 extends rearwardly from the flange 26 to bear against the forwardly disposed face of the flange 10, this stud being disposed in alignment with the roller 37 so that the aforesaid flange of the side frame member 10 is disposed therebetween. A roller 40 is mounted on the plate 31 in the same manner and in the same location as is the roller 35 on the plate 29. A roller 41 is mounted on the side flange 32 in the same manner and in the same position as the roller 37 is mounted on the side flange 30. A stud 42 extends through the flange 26 in alignment with the roller 40 so that the forwardly disposed flange of the side frame member 11 is disposed with the roller 41 and the stud 42, as best shown in Fig. 4.

Studs as 43 are mounted on the frame members 10 and 11 and are respectively aligned with the rollers 35 and 40 so that the forwardly disposed flanges of the side frame members 10 and 11 are respectively disposed between the studs 43 and the rollers 35 and 40. The studs 39, 42 and 43, along with the rollers 35, 37, 40 and 41 are effective to limit movement of the platform 24 relative to the side frame members 10 and 11, and the rollers 35 and 38 and 40 and 41 ride along the forwardly disposed flanges of the side frame members 10 and 11 to facilitate movement of the platform 24 relative to these side frame members.

In the form of the invention shown in Figs. 1 to 7, inclusive, the platform 24 is moved along side frame members 10 and 11 under the control of a hydraulic or other fluid actuated jack generally indicated by 44, a hydraulically operated jack being preferably used as illustrated in the drawings. The jack 44 includes an operating handle 45 which, when manipulated, is effective to cause the piston 46 of the jack and rod connected to the piston to move outwardly with respect to the cylinder 47 thereof. The cylinder 47 of the jack 44 has the lower end thereof rested on the upwardly disposed flange of the angle iron cross brace 13 and desirably a stud 48, Fig. 2, at the lower end of the cylinder 47 is passed through an opening in said upwardly disposed flange to thereby prevent relative movement between the angle iron 13 and the cylinder 47. A strap member 49, Fig. 4, has the midportion thereof engaged with a collar 50 disposed about the cylinder 47 and the angularly extending members of the strap member 49 extended to the inwardly disposed flanges of the side frame members 10 and 11, and the free ends of these angular portions are welded to the side frame members 10 and 11 adjacent to the connection of the end portions of the brace member 12 to these flanges. The arrangement is such that the collar 50 is clamped between the brace 12 and at the strap member 49 and this secures the jack 44 to the truck.

A clip 51 is mounted on the strap member 49 substantially midway in the extent thereof and one end of a cable or suitable flexible member 52 is secured thereto. This cable passes about a pulley, chain sprocket, or guide wheel 53 mounted in a suitable bracket 54 provided at the free end of the piston 46. From the pulley 53 the cable 52 is extended to a clip member 55, Fig. 2, provided on the underside of the shelf 25 and the cable 52 is firmly connected to this clip 55.

The jack 44 includes a conventional relief valve which, when open, permits the piston 46 to move inwardly of the cylinder 47. When the piston 47 is disposed in its inwardmost position the platform 24 will be disposed in its lowered position shown in Fig. 5. Then upon manipulation of the operating handle 45 the piston 46 is forced outwardly of the cylinder 47 thereby moving the bracket 54 and the pulley 53 upwardly. As the pulley 53 moves upwardly it is effective on the cable 52 to cause the end thereof connected to the clip 55 to be moved upwardly and since the clip 55 is carried by the platform 24 this is effective to move the platform 24 upwardly. Further, due to the mechanical advantage gained by the arrangement of the cable over the end of the piston rod, the platform moves twice the distance of that of the piston.

It is desirable that the shelf 25 of the platform 24 be arranged to extend in a horizontal plane when the tongue 19 is rested upon a supporting surface on which the wheels 16 and 17 are also rested. Such disposition of the shelf 25 insures against displacement of an article from the platform 24 when the truck is disposed in its normal-at-rest position in which it is shown in Figs. 1 and 2. However, when the platform 24 attains its lowered position it should extend in a downwardly inclined direction, as does the tongue 19, so as to facilitate insertion of the platform beneath an article to be transported on the truck. Therefore, an arrangement is embodied in the side frame members 10 and 11 to enable such inclination of the platform to be effected. Thus, as best shown in Figs. 2 and 5, the lower end portions 56 and 57 of the side frame members 10 and 11 are arranged to extend at an angle with respect to the main extent of these side frame members. The angular relation between the portions 56 and 57 and the main extent of the side frame members 10 and 11 is such that when the truck is disposed in its normal-at-rest position, as shown in Figs. 1 and 2, the portions 56 and 57 will extend in substantially vertical planes. The extent of the portions 56 and 57 is greater than the spacing between the rollers as 35 and 38, as best shown in Fig. 6. The effect of the angular extent of the portions 56 and 57 is that when the rollers 35 and 38 move onto the portion 56 and the rollers 40 and 41 move onto the portion 57, the shelf 25 of the platform 24 is inclined forwardly below a horizontal plane, as shown in Fig. 5, so that the forward marginal portion of the shelf 25 will rest on the front bar 22 of the tongue 19. This angular arrangement of the shelf 25 facilitates insertion thereof beneath an article to be supported on the truck. Once, however, an article has been disposed on the shelf 25 and the operating handle 45 of the jack 44 is operated to cause the piston 46 to move outwardly of the cylinder 47, then the platform 24 moves forwardly along the side frame members 10 and 11. As the rollers 38 and 41 move from the portions 56 and 57, respectively, the platform 24 starts to move into the aforesaid desired horizontal plane and by the time the rollers 35 and 40 have moved off the portions 56 and 57, respectively, the shelf 25 will be disposed in the aforesaid horizontal plane when the handle truck is in its normal-at-rest position, as shown in Figs. 1 and 2. The hand truck of this invention, as illustrated in Fig. 2, is adapted to stand in erect position without the need of external support and the platform 24 raised and lowered while the truck is in this position.

In Figs. 8 and 9 we have shown an arrangement which may be utilized in place of the jack 44. In this form of the invention the truck is arranged as described hereinabove and includes side frame members 10a and 11a which respectively correspond to side frame members 10 and 11. Bearings as 58 and 59 are provided in the inwardly disposed flanges of the side frame members 10a and 11a near the upper ends thereof and a shaft 60 is journaled in these bearings. A worm wheel 61 is mounted on the shaft 60 outwardly of the frame member 11a, a bushing 62 serving to dispose the worm wheel 61 in its desired position. A bracket 63 on the frame member 11a includes arms 64 and 65 in which a shaft 66 is journaled, the shaft 66 carrying a worm gear 67 that is meshed with the worm wheel 61. A crank 68 is mounted on the rear end of the shaft 60 and when this crank is manipulated to rotate the worm gear 66, such rotating movement is imparted through the worm gear 66 to the shaft 60.

A spool 69 is mounted on the shaft 60 and a cable 70 is adapted to be wound onto this spool 69 when the shaft 60 is rotated in a winding direction. The free end of the cable 70 (not shown) is connected to a clip like the clip 55 on the platform 24 so that when the shaft 60 is rotated in a winding direction and the cable 70 is wrapped on the spool 69, the platform is moved upwardly along the side frame members as 10a and 11a. When the shaft 60 is rotated in an unwinding direction the platform moves downwardly on the frame members 10a and 11a.

It will be manifest from the foregoing that the arrangements described herein enable the above set forth and kindred objects of this invention to be realized. Moreover, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A hand truck comprising a frame having longitudinally extending members, a handle on the upper part of said frame, a forwardly projecting tongue member on the lower end of said frame, spaced wheels on an axle mounted on said frame and adapted to roll on a floor for supporting the truck for transportation, a platform carried by said frame and movable longitudinally thereof to and from the upper part of said frame, said platform in its lowermost position on the frame being disposed on said tongue member; a hydraulic jack mounted on said frame, said jack including a piston and cylinder mechanism, said cylinder being arranged longitudinally of said frame, a rod member connected to said piston and extending from said cylinder toward said upper frame part, a pulley or guide wheel mounted on the outer end of said piston rod member, a lever on said frame which is adapted to be reciprocated to build up fluid pressure in said cylinder to cause said piston to move under the influence of hydraulic pressure and advance the piston rod and guide wheel forwardly of said cylinder, a flexible connecting member extending over said guide wheel, said flexible member being attached at one end to said platform and at the other end to said frame whereby manipulation of said hydraulic jack lever is effective to cause said platform to move along said frame.

2. A hand truck as claimed in claim 1 wherein said platform is mounted on rollers and disposed in position to ride over the front face portion of said frame and wherein said platform is slidably interlocked with the frame during movement of the same therealong.

3. A hand truck as claimed in claim 1 wherein the lower portion of said frame is extended at an angle to the main body portion whereby movement of the platform onto said lower portion when the hand truck is erect causes the platform to be inclined below a horizontal plane to thereby facilitate insertion of said platform beneath articles to be carried thereby.

4. In a hand truck having an elongated frame mounted on wheels and having a projecting tongue member mounted on the lower end of said frame and adapted to stand in erect position without exterior support, the combination with a platform carried by said frame and movable longitudinally thereof of a fluid pressure operated piston and cylinder mechanism, said cylinder being arranged longitudinally of said frame, a rod member connected to said piston and extending from said cylinder toward the upper part of said frame, a guide member mounted on the outer end of said piston rod, a lever on said frame which is adapted to be reciprocated to build up fluid pressure in said cylinder to cause said piston to move under the influence of fluid pressure and advance the piston rod and guide member forwardly thereof, a flexible connecting member extending over said guide member and having one end attached to said platform and the other end attached to said frame whereby manipulation of said lever is effective to cause the platform to move along said frame.

5. A hand truck as claimed in claim 4 wherein said frame comprises a plurality of spaced elongated members and wherein said platform is retained thereagainst while adapted to move longitudinally of said frame under the action of said fluid pressure operated piston, said cylinder being disposed in a substantially vertical position when the truck is standing erect.

ANTHONY M. SASGEN.
FRED P. HOPFELD.

REFERENCES CITED

The following references are of record in the file of this patent:

UNITED STATES PATENTS

| Number | Name | Date |
| --- | --- | --- |
| 474,653 | Deffler | May 10, 1892 |
| 1,015,104 | Wadlington | Jan. 16, 1912 |
| 2,431,096 | Van Den Bergh et al. | Nov. 18, 1947 |
| 2,488,461 | Wysocki | Nov. 15, 1949 |
| 2,514,825 | Zenko | July 11, 1950 |

FOREIGN PATENTS

| Number | Country | Date |
| --- | --- | --- |
| 118,906 | Australia | Sept. 4, 1944 |